US012117558B2

(12) United States Patent
Greenberg (10) Patent No.: US 12,117,558 B2
(45) Date of Patent: Oct. 15, 2024

(54) SPARSE PARTIAL FOURIER TRANSFORM

(71) Applicant: RAYTHEON COMPANY, Waltham, MA (US)

(72) Inventor: Adam Hodge Greenberg, Los Angeles, CA (US)

(73) Assignee: Raytheon Company, Tewksbury, MA (US)

( * ) Notice: Subject to any disclaimer, the term of this patent is extended or adjusted under 35 U.S.C. 154(b) by 664 days.

(21) Appl. No.: 17/322,629

(22) Filed: May 17, 2021

(65) Prior Publication Data

US 2022/0373642 A1   Nov. 24, 2022

(51) Int. Cl.
*G01S 7/35*   (2006.01)
*G01S 17/89*   (2020.01)

(52) U.S. Cl.
CPC .............. *G01S 7/356* (2021.05); *G01S 17/89* (2013.01)

(58) Field of Classification Search
None
See application file for complete search history.

(56) References Cited

U.S. PATENT DOCUMENTS

| | | | |
|---|---|---|---|
| 8,363,295 B2 | 1/2013 | Wilson et al. | |
| 9,313,072 B2 | 4/2016 | Katabi et al. | |
| 10,586,312 B2 | 3/2020 | Rijnders | |
| 2019/0011558 A1 | 1/2019 | Crouch et al. | |
| 2019/0086518 A1 | 3/2019 | Hallstig et al. | |

FOREIGN PATENT DOCUMENTS

WO   WO-2022157736 A2 *   7/2022

OTHER PUBLICATIONS

International Search Report for PCT/US22/29685 dated Sep. 28, 2022.
Kondor, R. Group Theoretical Methods in Machine Learning. Unofficial Corrected Version. Columbia University, Doctoral Thesis. May 2008 [retrieved on Aug. 24, 2022] Retrieved from the Internet <https://people.cs.uchicago.edu/-rlsi/papers/KondorThesis.pdf>; entire document especially p. 6, para 2, p. 38, para 1-2, p. 46, para 4-6, p. 47, para 4-5, Fig. 3.4.
Park, Y.C. et al. Fast Partial Fourier Transform . arXiv preprint arXiv:2008.12559v1. Aug. 28, 2020. [retrieved on Aug. 24, 2022) Retrieved from the Internet <https://arxiv .org/pdf/2008.12559. pdf>; entire document.

* cited by examiner

*Primary Examiner* — Whitney Moore (57) ABSTRACT

A method for transforming data from the time domain to the frequency domain. The method including receiving time domain input data, the time domain input data being sparse and binary-valued, obtaining at least one time vector corresponding to times of non-zero entries in the time domain input data, obtaining a frequency vector corresponding to frequencies of interest, determining at least one matrix corresponding to the at least one time vector and the frequency vector, performing a Sparse Partial Fourier Transform (SPFT) computation using the at least one matrix, and providing frequency domain output data corresponding to the time domain input data.

20 Claims, 9 Drawing Sheets

SPARSE PARTIAL FOURIER TRANSFORM

BACKGROUND

1. Field

Embodiments of the disclosure relate generally to laser radar systems and, more particularly, to the operation and control of multifunction laser radar systems and associated signal processing techniques.

2. Discussion of Related Art

As is known in the art, photon-counting laser radar systems, such as LIDAR and LADAR systems, can provide sensitive optical measurements for many applications. For example, laser radar systems can be used to provide three-dimensional imaging, mapping, object detection, segmentation, motion estimation/compensation, precision tracking, feature extraction, and feature discrimination. Such laser radar systems can be operated in different modes, including modes corresponding to incoherent and coherent functions.

SUMMARY

At least one aspect of the present disclosure is directed to a method for transforming data from the time domain to the frequency domain. The method includes receiving time domain input data, the time domain input data being sparse and binary-valued, obtaining at least one time vector corresponding to times of non-zero entries in the time domain input data, obtaining a frequency vector corresponding to frequencies of interest, determining at least one matrix corresponding to the at least one time vector and the frequency vector, performing a Sparse Partial Fourier Transform (SPFT) computation using the at least one matrix, and providing frequency domain output data corresponding to the time domain input data.

In one embodiment, receiving time domain input data includes receiving photo-event detections collected by a laser radar system. In some embodiments, obtaining the at least one time vector includes obtaining a first vector corresponding to an in-phase (I) modulation channel of the laser radar system and a second vector corresponding to a quadrature (Q) modulation channel of the laser radar system. In various embodiments, the method includes analyzing the frequency domain output data to localize a target frequency corresponding to a target being tracked by the laser radar system. In certain embodiments, the method includes using the frequency domain output data to perform at least one of: determine a high fidelity target radial velocity of a target being tracked by a laser radar system, or tune a laser frequency of the laser radar system to optimally track a target return frequency.

In some embodiments, the at least one time vector is a row vector and the frequency vector is a column vector. In one embodiment, determining the at least one matrix corresponding to the at least one time vector and the frequency vector includes calculating at least one outer product of the at least one time vector and the frequency vector. In certain embodiments, performing the SPFT computation using the at least one matrix includes selectively summing elements of a reference matrix that correspond to each element of the at least one matrix. In various embodiments, the reference matrix is a Discrete Fourier Transform matrix.

In one embodiment, the at least one time vector has a length of m, the frequency vector has a length of k, and the SPFT computation has a time complexity of $O(mk)$. In some embodiments, the frequency domain output data corresponds to a magnitude and/or a phase over frequency of the time domain input data.

Another aspect of the present disclosure is directed to a computing system for transforming data from the time domain to the frequency domain including at least one input configured to receive time domain input data, the time domain input data being sparse and binary-valued, and a controller configured to: obtain at least one time vector corresponding to times of non-zero entries in the time domain input data, obtain a frequency vector corresponding to frequencies of interest, determine at least one matrix corresponding to the at least one time vector and the frequency vector, perform a Sparse Partial Fourier Transform (SPFT) computation using the at least one matrix, and provide frequency domain output data corresponding to the time domain input data.

In one embodiment, the at least one input is configured to receive time domain input data corresponding to photo-event detections collected by a laser radar system. In some embodiments, the at least one time vector incudes a first vector corresponding to an in-phase (I) modulation channel of the laser radar system and a second vector corresponding to a quadrature (Q) modulation channel of the laser radar system. In various embodiments, the controller is further configured to analyze the frequency domain output data to localize a target frequency corresponding to a target being tracked by the laser radar system. In certain embodiments, the at least one time vector is a row vector and the frequency vector is a column vector.

In some embodiments, determining the at least one matrix corresponding to the at least one time vector and the frequency vector includes calculating at least one outer product of the at least one time vector and the frequency vector. In one embodiment, performing the SPFT computation using the at least one matrix includes selectively summing elements of a reference matrix that correspond to each element of the at least one matrix. In certain embodiments, the reference matrix is a Discrete Fourier Transform matrix. In various embodiments, the at least one time vector has a length of m, the frequency vector has a length of k, and the SPFT computation has a time complexity of $O(mk)$. In one embodiment, the frequency domain output data corresponds to a magnitude and/or a phase over frequency of the time domain input data.

Another aspect of the present disclosure is directed to a non-transitory computer readable medium comprising code which, when executed by at least one processor, controls the at least one processor to receive time domain input data, the time domain input data being sparse and binary-valued, obtain at least one time vector corresponding to times of non-zero entries in the time domain input data, obtain a frequency vector corresponding to frequencies of interest, determine at least one matrix corresponding to the at least one time vector and the frequency vector, perform a Sparse Partial Fourier Transform (SPFT) computation using the at least one matrix, and provide frequency domain output data corresponding to the time domain input data.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As described above, photon-counting laser radar systems, such as LIDAR and LADAR systems, can provide sensitive optical measurements for many applications. For example, laser radar systems can be used to provide three-dimensional imaging, mapping, object detection, segmentation, motion estimation/compensation, precision tracking, feature extraction, and feature discrimination.

Figure 1:
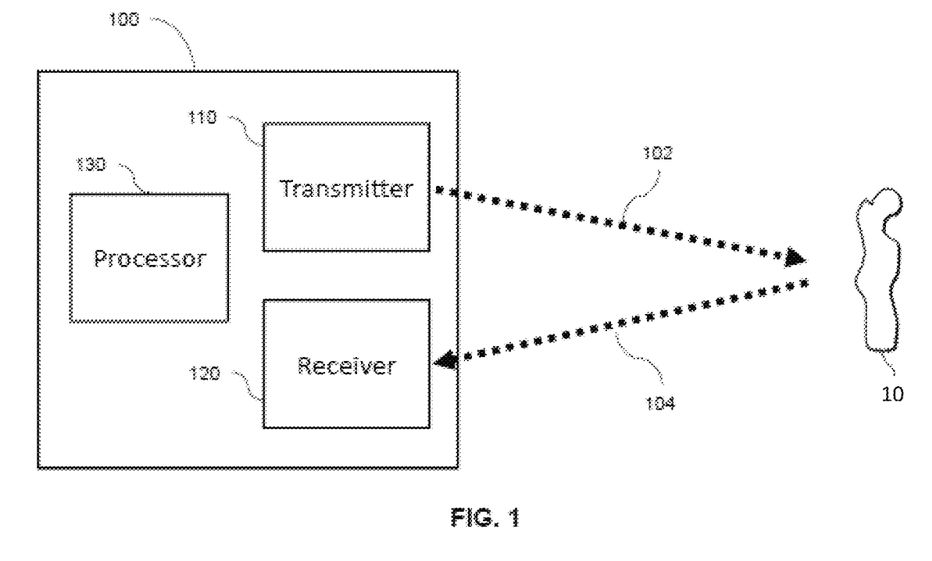
FIG. 1 is a block diagram of a target acquisition system in accordance with aspects described herein.

FIG. 1 illustrates a block diagram of a target acquisition system 100 according to aspects described herein. In one example, the target acquisition system 100, which includes a transmitter 110, a receiver 120, and a processor 130, is capable of detecting the range and range-rate of a target 10. In this example, the target 10 is a randomly shaped object, although this is for illustration only. In some examples, the target 10 may be a stationary or moving object or vessel (e.g., an airborne or land vessel, a fast-moving projectile, etc.).

The transmitter 110 is configured to generate laser pulses (e.g., pulses of photons) 102 at particular transmit times and to direct these pulses in a desired direction (e.g., in the direction of a target 10). In some examples, the emitted pulses may be about 1 ns to about 25 ns in duration, which may result in range measurements that may be accurate to within a few meters. The receiver (e.g., an optical receiver) 120 includes an optical system capable of collecting light reflected from the target 10 and a photodetector that is configured to record the arrival time of incoming light (e.g., reflected light) 104. The photodetector may be capable of timing the arrival of return pulses with an accuracy similar in scale to the transmitted laser pulse duration.

In some examples, the processor 130 is configured to control the operation of the transmitter 110 and receiver 120, and to concurrently (e.g., simultaneously) determine the range and the range-rate (i.e., velocity) of the target 10 based on the transmit and return times of photons. Henceforth, the terms speed, velocity, and range-rate refer to the velocity of the target 10 relative to the target acquisition system 100 along the range axis (i.e., the line/direction connecting the system 100 and the target 10). The processor 130 may accurately determine these target characteristics despite complex scattering of the transmitted light, imperfect detection of the returns, unwanted detections due to ambient light and electrical noise, modulation of the return due to target motion, and/or other practical complications and limitations.

In one example, the target acquisition system 100 corresponds to a multifunction laser radar system (e.g., LIDAR or LADAR). In some examples, the target acquisition system 100 can be configured to utilize an incoherent function and a coherent function. When operating with the incoherent function, the target acquisition system 100 may determine the range and range rate of the target 10 based on the intensity and arrival time of the light reflected by the target 10. Likewise, when operating with the coherent function, the target acquisition system 100 may determine the range and range rate of the target 10 based on the frequency (or phase) and arrival time of the light reflected by the target 10.

Figure 2:
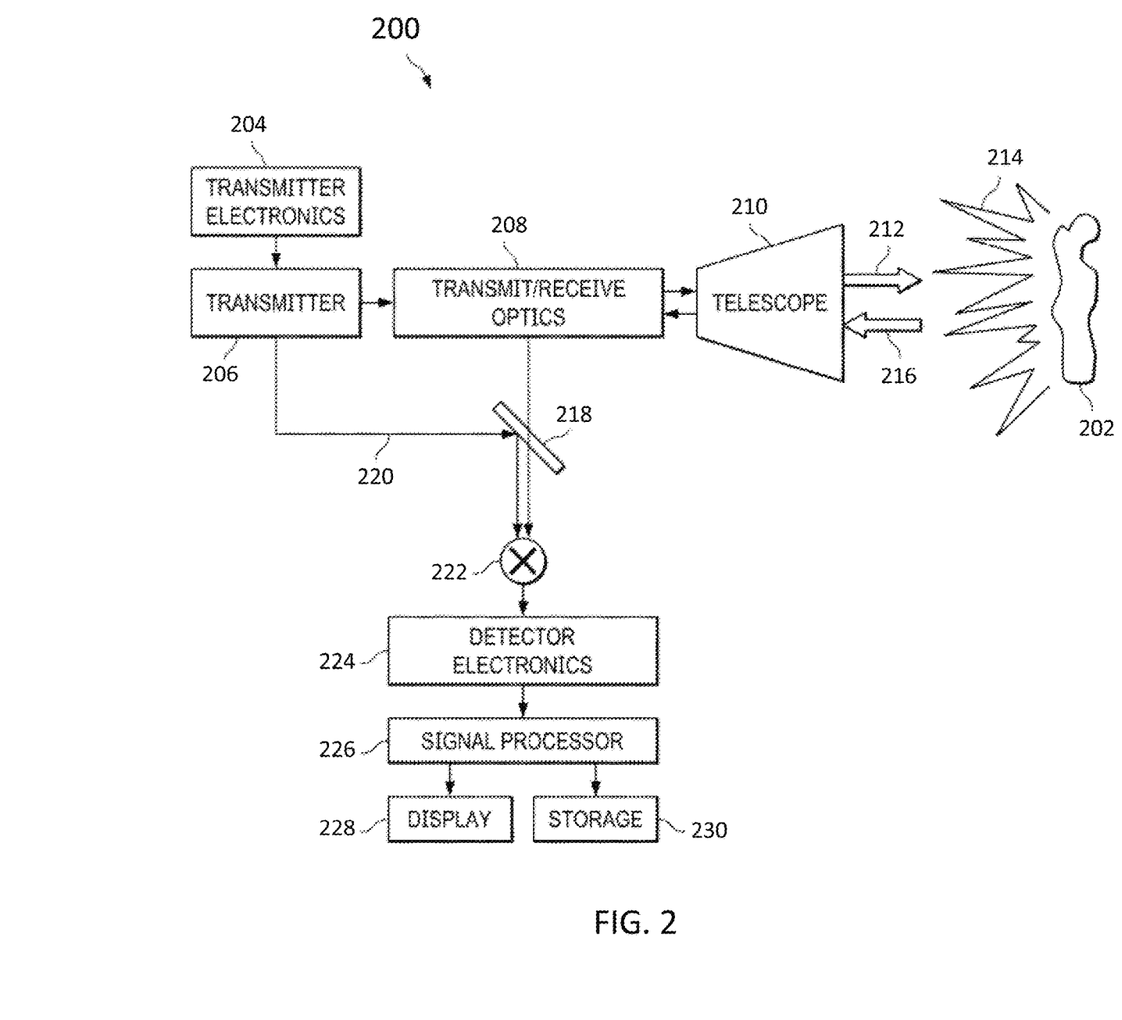
FIG. 2 is a block diagram of a LIDAR system in accordance with aspects described herein.

FIG. 2 illustrates a LIDAR system 200 according to aspects described herein. In one example, the LIDAR system 200 corresponds to the target acquisition system 100 of FIG. 1. As shown in FIG. 2, the system 200 is used to detect one or more targets 202 (e.g., target 10). Any suitable targets 202 could be detected by the system 200. The system 200 can also be used to identify any suitable parameter or parameters of interest related to the target 202. Example parameters that could be detected by the system 200 include range (i.e., distance) and Doppler velocity (i.e., speed) of the target 202.

In one example, the LIDAR system 200 includes transmitter electronics 204 and a transmitter 206. The transmitter electronics 204 generally operate to generate an electrical signal, and the transmitter 206 generally operates to convert the electrical signal into an optical signal. For example, the transmitter electronics 204 can include electrical components that generate an electrical signal having a desired waveform, and the transmitter 206 can generate a laser signal having the same waveform. The transmitter electronics 204 may include any suitable structure for controlling operation of a transmitter. Likewise, the transmitter 206 may include any suitable structure for generating a laser signal or other optical signals containing pulses.

The optical signal from the transmitter 206 is provided via transmit/receive optics 208 to a telescope 210. The transmit/receive optics 208 function as a transmit/receive switch and allow both outgoing and incoming signals to pass through the telescope 210. The transmit/receive optics 208 may include any suitable optic device or devices for facilitating both transmission and reception of optical signals through a telescope or other common structure.

The telescope 210 generally operates to direct an outgoing signal 212 towards the one or more targets 202. The optical signal 212 denotes the optical signal generated by the transmitter 206 and includes a plurality of pulses (e.g., doublet pulses) in a LIDAR waveform. The transmission of the optical signal 212 towards the target 202 results in reflected laser light 214 that can travel in various directions from the target 202. At least some of the reflected laser light 214 travels back to the telescope 210 as an optical signal 216. The telescope 210 can therefore be used to direct laser pulses toward a target 202 of interest and to receive reflected laser pulses from the target 202. The telescope 210 can include focusing optics or other optical devices to facilitate the directing of pulses towards the target 202 and the receipt of reflected pulses from the target 202. The telescope 210 may include any suitable structure for directing and receiving optical signals.

The reflected optical signal 216 received by the telescope 210 is directed through the transmit/receive optics 208 to a LIDAR receiver that processes the reflected optical signal 216. In the illustrated example, the reflected optical signal 216 is directed to a dichroic mirror 218. The dichroic mirror 218 allows the optical signal 216 to pass while reflecting an optical signal 220 from the transmitter 206. As described below, the optical signal 220 may denote a signal that is based on a laser source in the transmitter 206.

A mixer 222 mixes the optical signals 216 and 220 and generates an output, which is based on both optical signals 216 and 220. For example, the output of the mixer 222 could include pulses contained in the optical signal 216 that were received within longer pulses contained in the optical signal 220. Detector electronics 224 use the output of the mixer 222 to identify pulses in the optical signal 216. The identified pulses are analyzed by a signal processor 226, which can use the pulses to detect the target 202 and one or more parameters of the target 202 (such as range and Doppler velocity).

The mixer 222 may include any suitable structure for mixing optical signals. The detector electronics 224 may include any suitable structure for detecting optical signals, such as a Geiger Mode Avalanche Photo Diodes (GMAPD) detector array. The signal processor 226 may include any suitable structure for analyzing signals, such as a microprocessor, microcontroller, digital signal processor (DSP), field programmable gate array (FPGA), application specific integrated circuit (ASIC), or discrete logic devices. In some examples, the signal processor 226 can execute software instructions for detecting and analyzing pulses. The outputs of the signal processor 226 can be used in any suitable manner. In one example, the outputs of the signal processor 226 can be presented on display device 228 (such as a monitor) or stored on a storage device 230 (such as a RAM, ROM, flash memory, hard drive, or optical disc). In other examples, the outputs of the signal processor 226 can be used in any other suitable manner and can be provided to other suitable devices or systems. In some examples, the processor 130 of FIG. 1 corresponds to the signal processor 226; however, in other examples, the processor 130 may correspond to a different processor (or controller) not shown in FIG. 2.

It should be appreciated that FIG. 2 illustrates one example of a LIDAR system 200, and various changes may be made to FIG. 2. For example, LIDAR systems may include a number of additional components that provide a wide variety of functions not included/shown in the system 200 of FIG. 2. Likewise, LIDAR systems can be configured differently and may not include every component shown in the system 200 of FIG. 2.

In some cases, laser radar systems (e.g., the system 200) can be operated in different modes, including modes corresponding to incoherent (i.e., direct-detect) and coherent functions. As described above, when operating with the incoherent function, the laser radar system may determine the range and range rate of the target based on the intensity and arrival time of the light reflected by the target. Likewise, when operating with the coherent function, the laser radar system may determine the range and range rate of the target based on the frequency (or phase) and arrival time of the light reflected by the target.

In some examples, the coherent function can provide higher-precision measurements of target range and range rate compared to the incoherent function. However, despite these advantages, the coherent function can experience certain performance limitations. For example, due to the self-blocking nature of GMAPD detectors, coherent GMAPD LIDAR systems or systems with coherent GMAPD LIDAR functions can have lower sensitivity than their incoherent counterparts, and therefore may experience a higher signal-to-noise ratio (SNR) floor (at least for the purposes of initial target detection). In addition, low signal observing scenarios, coupled with the quantum nature of optical LIDAR data, often necessitate large numbers of temporal samples before a target can be detected. As such, current coherent processing techniques (such as the Fast Fourier Transform (FFT)) can struggle to run in the rapid timeframes that are demanded by realistic operational scenarios. As such, it may be advantageous for laser radar systems to be configured as multifunction systems that utilize control and processing techniques to leverage the strengths of each function. For example, multifunction systems may be capable of various modes of operation that are not employed simultaneously but may be employed sequentially, in response to observed conditions. In some examples, such multifunction systems are configured to provide incoherent functionality and/or coherent functionality; however, in other examples, multifunction systems may support additional or different functions (or operations).

Accordingly, an improved control method for operating a multifunction laser radar system is provided herein. In at least one embodiment, the control method utilizes adaptive waveform design, real-time signal processing, and closed-loop feedback to improve the utility of the multifunction laser radar system. In one example, the control method is configured to select a function of the laser radar system to optimize performance and resource utilization. In some examples, the control method is configured to control the laser radar system to utilize incoherent and coherent functions.

Figure 3:
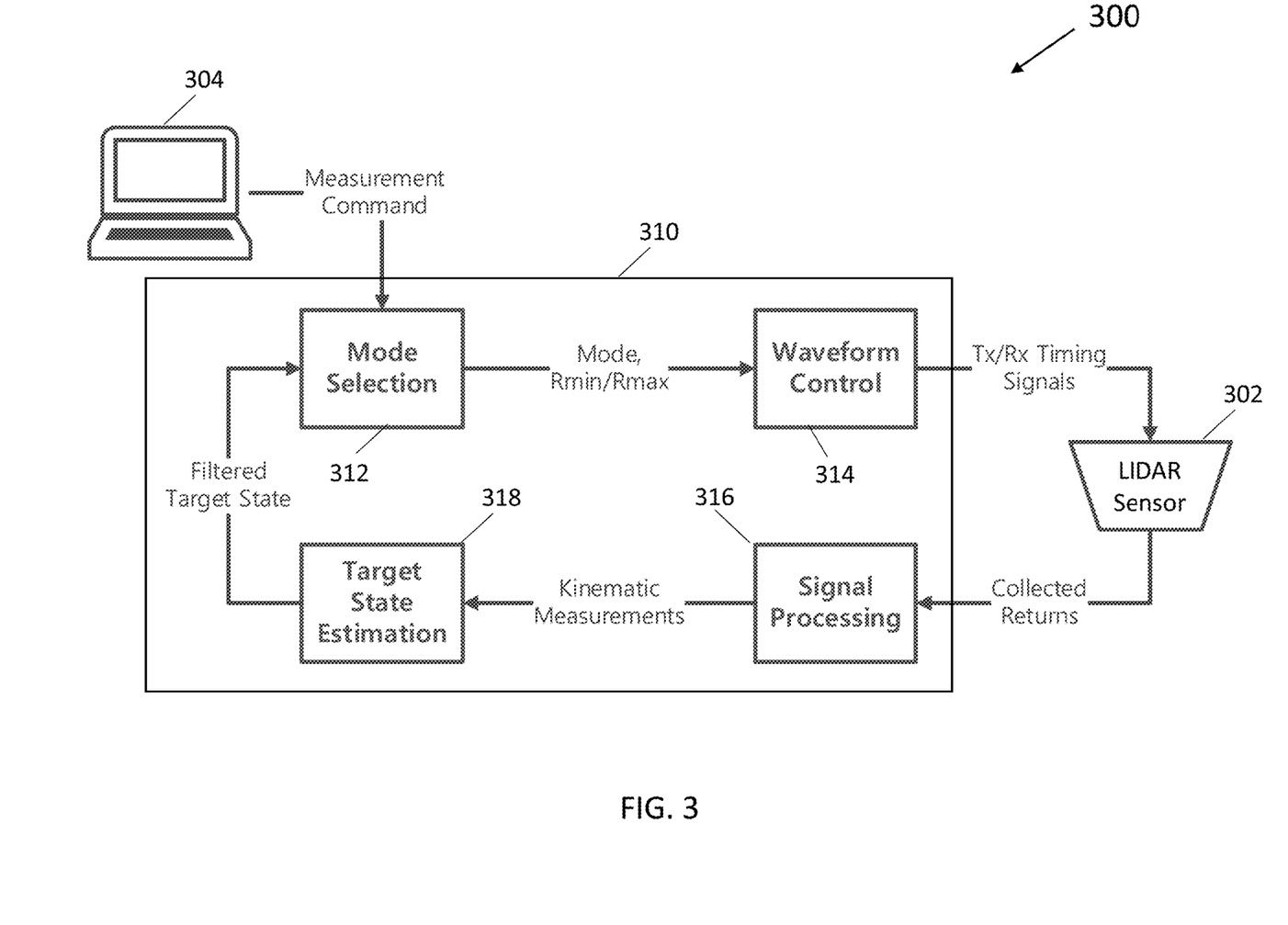
FIG. 3 is a block diagram of a control arrangement in accordance with aspects described herein.

FIG. 3 is a functional block diagram of a control arrangement 300 in accordance with aspects described herein. In one example, the control arrangement 300 corresponds to a controller 310 configured to operate a multifunction laser radar system 302. In some examples, the laser radar system 302 may correspond to the target acquisition system 100 of FIG. 1 or the LIDAR system 200 of FIG. 2; however, in other examples, the laser radar system 302 may have a different configuration. Likewise, the controller 310 may correspond to the processor 130 included in the target acquisition system 100; however, in other examples, the controller 310 may be one or more different controllers or processors.

In various examples, the controller 310 may include one or more general computing processors, specialized processors, or microcontrollers. The controller 310 may include programmed, special-purpose hardware, for example, an ASIC, or more generally designed hardware, such as an FPGA or a general-purpose processor. In some examples, the controller 310 may include one or more memory devices, such as a disk drive, memory, flash memory, embedded or on-chip memory, or other device for storing data.

In some examples, the control arrangement 300 includes a computing system 304. The computing system 304 may provide a user interface that allows a user to provide inputs commands, and in some cases, receive feedback from the controller 310. The laser radar system 302 may be controlled or operated by the computing system 304, the controller 310, a controller or processor included in a vehicle housing the laser radar system 302, or a different controller, processor, or computing system.

In one example, the controller 310 includes a mode selection module 312, a waveform control module 314, a signal processing module 316, and a target state estimation module 318. In some examples, each of the modules 310-318 corresponds to a software module including one or more algorithms or instructions.

The mode selection module 312 of the controller 310 is configured to select an initial mode for the laser radar system 302. In one example, the mode is selected from a plurality of modes or functions of the laser radar system 302. In some examples, the plurality of modes includes a first mode corresponding to an incoherent (i.e., direct-detect) function of the laser radar system 302 and a second mode corresponding to a coherent function of the laser radar system 302. In certain examples, the plurality of modes can include multiple modes corresponding to the incoherent function of the laser radar system 302 and/or multiple modes corresponding to the coherent function of the laser radar system 302.

In some examples, the mode selection module 312 is configured to select the initial mode based on an initial target state (or initial parameters) provided by the user (e.g., via the computing system 304) or another controller/processor included in the vehicle housing the laser radar system 302. The initial target state may include estimates associated with the type of targets being tracked (e.g., range and range rate). In certain examples, the initial target state may include an estimated range minimum (Rmin) and an estimated range maximum (Rmax). As such, the mode selection module 312 may select the mode of the laser radar system 302 best suited for the initial target state as the initial mode. For example, the mode(s) corresponding to the incoherent function (i.e., the first mode) may provide fast target range and initial range rate detections and disambiguation with a relative coarse resolution. Likewise, the mode(s) corresponding to the coherent function (i.e., the second mode) may provide target range and range rate detections and disambiguation with a precise resolution.

In some examples, the mode selection module 312 can be configured to select the initial mode based on a level of uncertainty associated with the initial target state. For example, the range of the initial target state may include a range spread/extent (e.g., Rmin to Rmax) to encompass target movement variability and multiple types of targets. As such, when selecting the initial mode, there may be a level of uncertainty with respect to the actual target parameters. In some examples, when the level of uncertainty associated with the initial target state is high (i.e., above a threshold), the first mode corresponding to the incoherent function of the laser radar system 302 may be selected as the initial mode. Likewise, when the level of uncertainty associated with the initial target state is low (i.e., below a threshold), the second mode corresponding to the coherent function of the laser radar system 302 may be selected as the initial mode.

In one example, the mode selection module 312 is configured to provide the initial mode and the initial target state (or parameters) to the waveform control module 314 of the controller 310. The waveform control module 314 is configured to select or adjust waveform controls and parameters based on the initial mode. In some examples, the waveform controls can be configured based on the current function of the laser radar system 302 being used (i.e., incoherent or coherent) and the target state (e.g., Rmin, Rmax, etc.). For example, the laser radar system 302 may be configured to transmit and receive pulsed waveforms and the pulse width (PW), and/or pulse repetition interval (PRI) of the pulsed waveforms may be adjusted based on the initial mode and the initial target state.

In one example, when the mode corresponds to the incoherent function of the laser radar system 302, the laser radar system 302 may be configured to transmit a pulse-position-modulated (PPM) waveform. The emitted pulses may be approximately 1 ns to 25 ns in duration, which may result in measurements that are accurate to within a few meters. In some examples, the waveform control module 314 can adjust one or more parameters of the PPM waveform (e.g., transmit times, duration) based on the mode and/or target state.

In one example, when the mode corresponds to the coherent function of the laser radar system 302, the laser radar system 302 may be configured to transmit and receive coherent doublet pulse waveforms. Examples of coherent doublet pulse waveforms are described in U.S. Patent Publication No. 2019/0072651 to Halmos et al. tilted "LADAR SYSTEM SUPPORTING DOUBLET WAVEFORM FOR SEQUENTIAL IN-PHASE (I) AND QUADRATURE (Q) PROCESSING," which is hereby incorporated herein by reference. As such, one or more parameters of such coherent doublet pulse waveforms can be adjusted or controlled to provide optimal performance.

In one example, the waveform control module 314 is configured to provide the waveform controls to the laser radar system 302. Once the waveform controls have been received, the laser radar system 302 can collect measurements. As shown, the collected returns from the laser radar system 302 are provided to the signal processing module 316 of the controller 310. The collected returns are processed to determine characteristics of the target and the scene. As described above, when operating with the incoherent function, the laser radar system 302 can determine the characteristics of the scene and the target based on the intensity and arrival time of the light reflected by the target (or the scene). Likewise, when operating with the coherent function, the laser radar system 302 can determine characteristics of the scene and the target based on the frequency (or phase) and arrival time of the light reflected by the target (or the scene). As such, the signal processing module 316 may utilize different processing techniques depending on the mode (i.e., function) of the laser radar system 302. The signal processing techniques can be used to provide kinematic measurements of the target, including position and velocity (or range rate). In some examples, the target position may correspond to an instantaneous measurement of the target range and the position in azimuth and elevation (Az/El).

Figure 4:
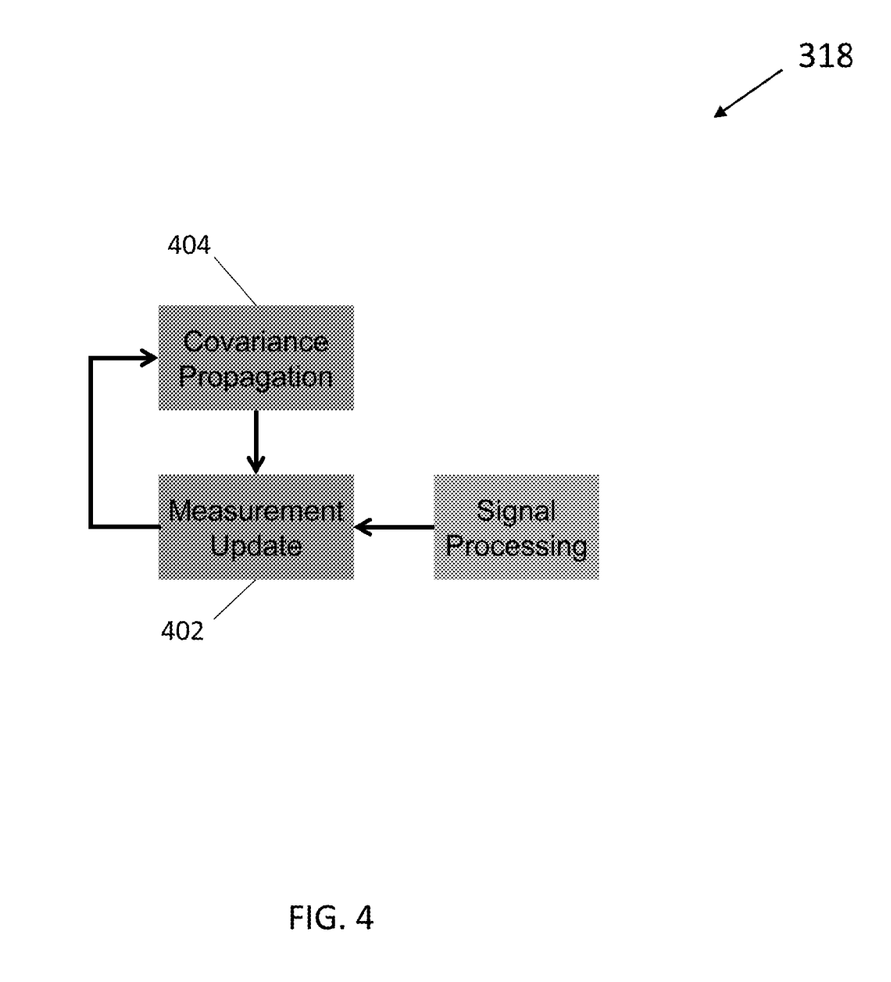
FIG. 4 is a block diagram of a target state estimator in accordance with aspects described herein.

In one example, the signal processing module 316 is configured to provide the kinematic measurements (i.e., target position/velocity) to the target state estimation module 318 of the controller 310. FIG. 4 is a block diagram of a target state estimator 400 in accordance with aspects described herein. In one example, the target state estimator 400 is included in the target state estimation module 318. In some examples, the target state estimator 400 corresponds to a Kalman filter.

As shown, the kinematic measurements are provided to a measurement update function 402. The measurement update function 402 produces an estimate of the target state (i.e., position/velocity) based on the kinematic measurements and provides the estimated target state to a covariance propagation function 404. The covariance propagation function 404 is configured to determine an uncertainty level (or factor) of the estimated target state based on a covariance between target position and velocity (or range rate). As such, the kinematic measurements can be integrated over time by the target state estimator 400 to provide a refined target state. For example, when the next set of kinematic measurements are provided to the measurement update function 402, the estimates can be updated as the level of certainty improves by the covariance propagation function 404. In some examples, a weighted average may be applied to the estimated target states using weights scaled to the various levels of uncertainty. In one example, the target state estimator 400 is configured to provide a filtered target state and an uncertainty level associated with the filtered target state. In some examples, the uncertainty level associated with the filtered target state is the square root of the target state estimate covariance.

In certain examples, the measurement update function 402 is configured to run with an update rate that is application dependent (e.g., 1-20 Hz). The covariance propagation function 404 may be configured to run at an order of magnitude faster than the measurement update function 402 (e.g., 10-200 Hz) to provide filtered target states that can be utilized for asynchronous mode selection.

In one example, the target state estimation module 318 is configured to provide the filtered target state and the corresponding uncertainty level (from the target state estimator 400) to the mode selection module 312 of the controller 310. As such, the mode selection module 212 can utilize the filtered target state and the corresponding uncertainty level to select the next mode for the laser radar system 302. In some examples, the next mode may be the same as the initial mode; however, if the filtered target state and/or the uncertainty level associated with the filtered target state changes, a different mode may be selected. For example, if the first mode corresponding to the incoherent function of the laser radar system 302 was selected for the initial mode and the uncertainty level of the updated target state improves (e.g., falls below the threshold), the laser radar system 302 may be transitioned to the second mode corresponding to the coherent function of the laser radar system 302. Likewise, if the uncertainty level of the updated target state stays substantially the same or worsens (e.g., remains above the threshold), the laser radar system 302 may continue to operate in the first mode corresponding to the incoherent function of the laser radar system 302. Once the next mode for the laser radar system 302 has been selected, the mode selection module 312 can provide the new mode and the filtered target state to the waveform control module 314 and the cycle repeats.

In some examples, in addition to the uncertainty level of the target state, there may be additional criteria used by the mode selection module 312 to select the mode for the laser radar system 302. In one example, each mode (or function) of the laser radar system 302 may provide optimal performance under different conditions and/or target states. The criteria corresponding to each mode (or function) may correspond to the range extent of the target state. In other words, each mode (or function) may correspond to different fields of view (FOV) of the laser radar system 302. In one example, as the accuracy (or uncertainty) of the target state estimates improves, the mode selection module 312 may select modes having FOVs with increasing levels of focus for the laser radar system 302.

Figure 5:
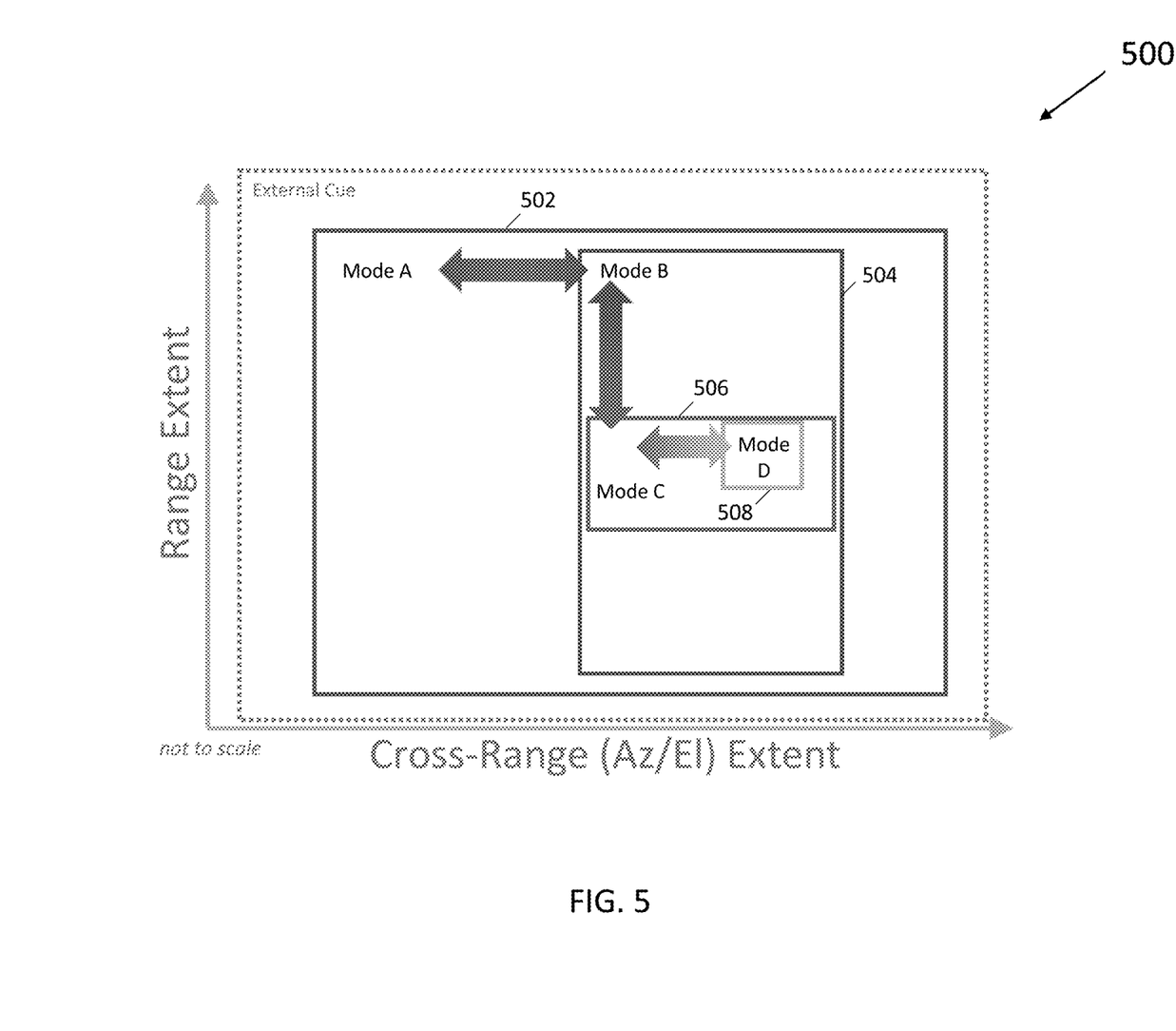
FIG. 5 is a graph of three-dimensional field-of-views corresponding to different modes of operation in accordance with aspects described herein.

For example, FIG. 5 is a graph 500 illustrating three-dimensional FOVs corresponding to different modes in accordance with aspects described herein. In one example, the graph 500 includes a FOV 502 corresponding to a Mode A of the laser radar system 302, a FOV 504 corresponding to a Mode B of the laser radar system 302, a FOV 506 corresponding to a Mode C of the laser radar system 302, and a FOV 508 corresponding to a Mode D of the laser radar system 302. As shown, the y-axis of the graph 500 represents the range extent (e.g., coverage along the range axis) for each FOV. Likewise, the x-axis of the graph 500 represents the cross-range extent (e.g., Az/El coverage perpendicular to the range axis) for each FOV.

In one example, the mode with the FOV that best matches the current target state estimate may be selected for the laser radar system 302. For example, before a target state estimate has been provided or determined, the laser radar system 302 may operate in Mode A. In some examples, Mode A corresponds to a passive mode/function and the laser radar system 302 may passively monitor a broad scene (i.e., FOV 502) while operating in Mode A. In other examples, Mode A may correspond to an idle state of the laser radar system 302. Once a target state estimate is provided/determined (e.g., the initial target state), the target state estimate can be evaluated to select the next mode for the laser radar system 302. For example, based on the target state estimate and the associated uncertainty level, the laser radar system 302 may be transitioned from Mode A to Mode B. In one example, Mode B is a range acquisition mode that corresponds to the incoherent function of the laser radar system 302. While operating in Mode B, the laser radar system 302 can collect measurements over the FOV 504 and the controller 310 can provide an updated target state estimate based the collected measurements. In some examples, the laser radar system 302 may continue to operate in Mode B until the updated target state estimate and the associated uncertainty level reflect the criteria for transitioning to Mode C (e.g., smaller range extent). In one example, Mode C is a direct-detect mode that corresponds to the incoherent function of the laser radar system 302. While operating in Mode C, the laser radar system 302 can collect measurements over the FOV 506 and the controller 310 can provide an updated target state estimate based on the collected measurements. In some examples, the laser radar system 302 may continue to operate in Mode C until the updated target state estimate and the associated uncertainty level reflect the criteria for transitioning to Mode D (e.g., smaller range extent and cross-range extent). In one example, Mode D is a range resolved vibration mode that corresponds to the coherent function of the laser radar system 302. While operating in Mode D, the laser radar system 302 can collect measurements over the FOV 508 and the controller 310 can provide updated target state estimates based on the collected measurements. In some examples, the laser radar system 302 may continue to operate in Mode D until the updated target state estimates and the associated uncertainty levels reflect criteria for transitioning back to Modes A, B, or C (e.g., larger range extent or cross-range extent).

In one example, the target state estimates produced during each mode may not be considered valid until a minimum mode time has elapsed. For example, the laser radar system 302 may operate in Mode B for at least the minimum mode time before transitioning to Mode C, and so on. In addition, it should be appreciated that the laser radar system 302 can be transitioned between the various modes in any order. For example, if the laser radar system 302 is operating in Mode B and the target state estimate meets the criteria for Mode D, then the controller 310 may transition the laser radar system 302 directly to Mode D. Likewise, if the laser radar system 302 is operating in Mode D and the target state estimate falls out of the criteria for Mode D, the laser radar system 302 may be transitioned to any of Mode A, B, or C.

While the laser radar system 302 is described above as supporting four modes (i.e., Modes A-D), it should be appreciated that these modes are provided merely as examples. In other embodiments, the laser radar system 302 may support a different number and/or configuration of modes corresponding to the incoherent and/or coherent functions of the laser radar system 302.

Figure 6:
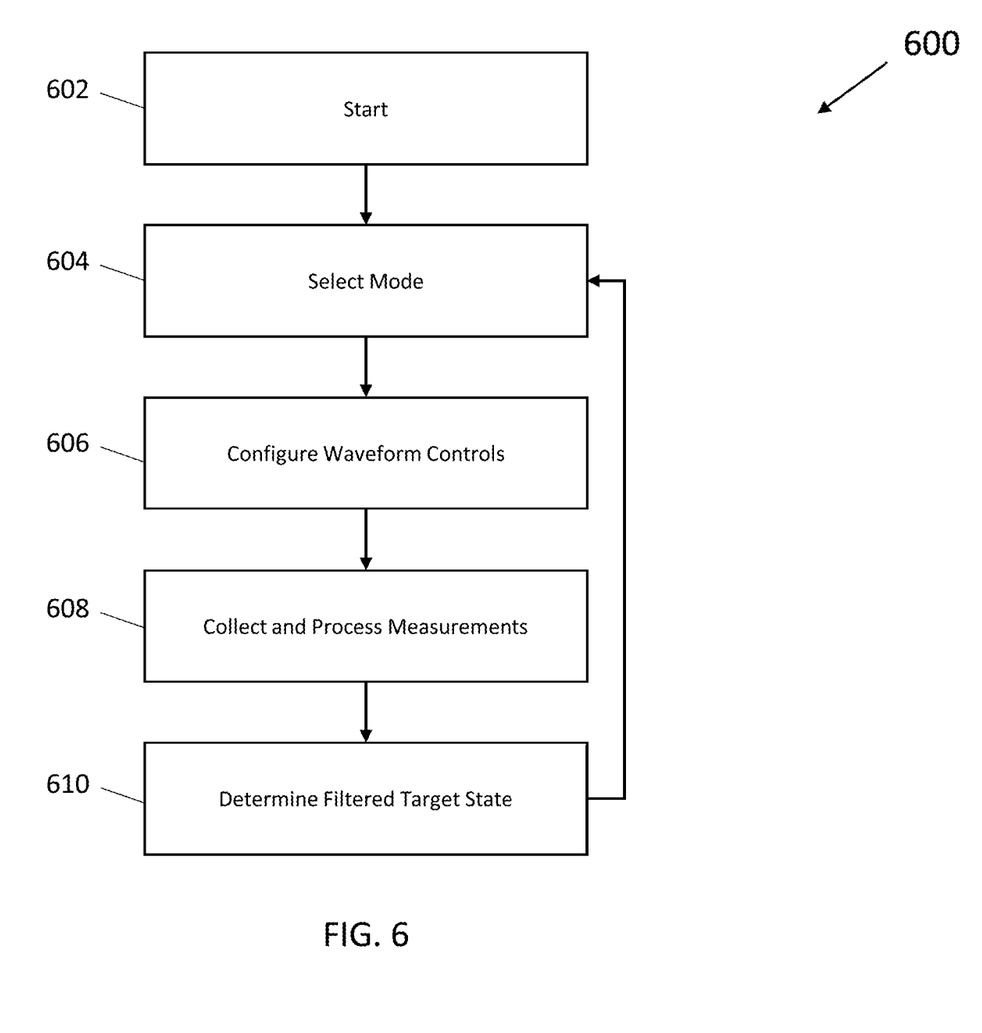
FIG. 6 is a flow diagram of a control method for operating a laser radar system in accordance with aspects described herein.

FIG. 6 is a flow diagram of a control method 600 for operating the laser radar system 302 in accordance with aspects described herein. In one example, the control method 600 corresponds to the control arrangement 300 of FIG. 3 and may be carried out by the controller 310.

At block 602, the controller 310 is configured to start the control method 600. In some examples, the control method 600 is started based on a command received by the controller 310 from the computing system 304 (e.g., "Start Measurement"). In other examples, the controller 310 may start the control method 600 based on a command received from a different controller/processor. In some examples, the controller 310 may automatically start the control method 600 based on the occurrence of an event or condition (e.g., time, location, etc.).

At block 604, the controller 310 selects an initial mode for the laser radar system 302 (e.g., via the mode selection module 312). As described above, the initial mode may be selected from a plurality of modes or functions of the laser radar system 302. In certain examples, the plurality of modes may include multiple modes corresponding to the incoherent function of the laser radar system 302 and/or multiple modes corresponding to the coherent function of the laser radar system 302. In some examples, the initial mode is selected by the controller 310 based on an initial target state (and uncertainty level).

At block 606, the controller 310 configures or adjusts waveform controls for the laser radar system 302 (e.g., via the waveform selection module 314). In some examples, the waveform controls can be configured based on the function of the laser radar system 302 being used (i.e., incoherent or coherent), the mode of the laser radar system 302, and/or the target state (or uncertainty level).

At block 608, the waveform controls are provided to the laser radar system 302 and the laser radar system 302 collects measurements. The collected returns from the laser radar system 302 are provided to the controller 230. In one example, the controller 310 is configured to process the collected returns (e.g., via the signal processing module 316) to determine measurements of the target and the scene. In some examples, the controller 316 may utilize different processing techniques depending on the mode (or function) of the laser radar system 302. The controller 310 is configured to use the signal processing techniques to provide kinematic measurements of the target(s), including position and velocity (or range rate).

At block 610, the controller 310 determines a filtered target state (e.g., via the target state estimation module 318) using the kinematic measurements. In one example, the controller 310 is configured to use a target state estimator (e.g., target state estimator 400) to provide a filtered target state and an uncertainty level associated with the filtered target state. In some examples, the covariance between target position and velocity is used to determine the filtered target state and the associated uncertainty level. Once the filtered target state has been determined, the control method 600 returns to block 604 and the controller 310 selects a new mode for the laser radar system 302. In some examples, the new mode selected by the controller 310 may be the same as the initial mode; however, if the filtered target state and/or the uncertainty level associated with the filtered target state changes, the controller 310 may select a different mode. As described above with respect to FIG. 5, the controller 310 can select modes having FOVs with increasing levels of focus for the laser radar system 302 as the filtered target state and level of uncertainty improve. Once the new mode has been selected, the control method 600 returns to block 606 and the cycle repeats.

As described above, the control method 600 operates with a closed-loop process flow. In some examples, the control method 600 is configured to complete a loop (i.e., mode selection to new filtered target state) within one dwell of the laser radar system 302. Each dwell of the laser radar system 302 corresponds to an amount of time allotted for the laser radar system 302 to spend on a target. For example, the dwell time may correspond to the time it takes for the laser radar system 302 to transmit waveforms towards a target and collect returns reflected by the target. In some applications, the laser radar system 302 can operate with relatively short dwell times, and the controller 310 may utilize signal processing techniques to reduce the closed-loop time of the control method 600.

In one example, the controller 310 is configured to use different signal processing techniques based on the mode of the laser radar system 302. For example, the signal processing techniques used by the controller 310 may depend on the function of the laser radar system 302 (i.e., incoherent or coherent) corresponding to the current mode. As such, the signal processing module 316 of the controller 310 can be configured to provide adaptive signal processing techniques based on the mode (or function) of the laser radar system 302.

As described above, laser radar systems (e.g., LIDAR or LADAR) detect individual photons reflected by targets and often operate in the quantum limit. The detection of individual photons differs from a traditional RADAR system, which may sense a received voltage to infer an electromagnetic field. As such, laser radar systems (and associated processing systems) may contend with low-signal targets resulting in highly sparse data. In some examples, the sparse data generated by laser radar systems is binary-valued and bandwidth constrained. In certain examples, such discretized and low-count data comes with processing limitations (e.g., shot-noise dominated statistics). As such, it may be advantageous to exploit the sparse nature of the data to provide computational leverage and achieve faster calculation times.

In one example, when the laser radar system 302 is operating with the incoherent function, the signal processing module 316 is configured to provide sparse incoherent processing. As described above, when the laser radar system 302 is operating with the incoherent function, the range and range rate of the target can be determined based on the intensity and arrival time of the light reflected by the target. As such, the collected returns provided to the signal processing module 316 (i.e., the controller 310) from the laser radar system 302 may correspond to the arrival times of the reflected light. In some examples, the sparse incoherent processing includes an algorithm configured to provide a cross-correlation of the measured return timings with transmitted pulse timings (or scaled transmit pulse timings) to determine the target range and range-rate (or velocity). The algorithm may search for target signatures across multiple dimensions to achieve low false-alarm rates, multi-target segmentation, and low detection SNR floors. An example of such sparse incoherent processing is described in U.S. patent application Ser. No. 16/863,064 to Greenberg et al. titled "SYSTEM AND METHOD FOR DETERMINING RANGE-RATE AND RANGE EXTENT OF A TARGET," which is hereby incorporated herein by reference.

Similarly, when the laser radar system 302 is operating with the coherent function, the signal processing module 316 is configured to provide coherent processing. As described above, when operating with the coherent function, the target acquisition system 100 may determine the range and range rate of the target based on the frequency (or phase) and arrival time of the light reflected by the target. As such, the collected returns provided to the signal processing module 316 (i.e., the controller 310) from the laser radar system 302 may correspond to the frequency (or phase) and the arrival times of the reflected light.

In some examples, the signal processing module 316 may perform a Fourier Transform to derive frequency (or phase) information from the data provided by the laser radar system 302. The Fast Fourier Transform (FFT) algorithm is a well-established and mature technique for calculating the spectrum of real and/or complex valued data. The FFT operates with an O(N log N) time complexity, where N is the size (or length) of the data. In comparison, this is much faster than the Naïve Discrete Fourier Transform (NDFT) technique, which operates with an O(N²) time complexity. The FFT leverages symmetries intrinsic to the Fourier transform, thereby achieving an N/log N improvement in speed relative to the NDFT. However, in order to utilize these symmetries, the FFT must calculate the entire spectral extent of the output transform. In other words, it cannot selectively compute a portion of frequencies while ignoring (or skipping) others. In addition, the FFT must examine all input temporal samples, even those that are zero-valued.

In some examples, a Fourier transform may be performed using a standard DFT matrix (e.g., Vandermonde), as shown below in equation (1):

$$\mathcal{F} = \begin{bmatrix} 1 & 1 & 1 & \cdots & 1 \\ 1 & e^{-2\pi i \cdot 1/N} & e^{-2\pi i \cdot 2/N} & \cdots & e^{-2\pi i \cdot (N-1)/N} \\ 1 & e^{-2\pi i \cdot 2/N} & e^{-2\pi i \cdot 4/N} & \cdots & e^{-2\pi i \cdot 2(N-1)/N} \\ \vdots & \vdots & \vdots & \ddots & \vdots \\ 1 & e^{-2\pi i \cdot (N-1)/N} & e^{-2\pi i \cdot 2(N-1)/N} & \cdots & e^{-2\pi i \cdot (N-1)(N-1)/N} \end{bmatrix} \quad (1)$$

Computationally, the Fourier transform can be determined by performing the operation, shown below in equation (2):

$$\hat{x} = \mathcal{F} x \quad (2)$$

where, x is the time-domain complex valued vector of the measured inputs and $\hat{x}$ is the frequency-domain complex valued transformed output. Depending on the size of the data (N), the matrix multiplication shown in equation (2) may correspond to a fairly complex and lengthy computation (e.g., 3500 ms).

Being that the FFT leverages these same symmetries over the entire spectral extent of the output transform for all temporal input samples, using an FFT to process data from laser radar systems (e.g., laser radar system 302) can be complex and time consuming. As such, additional processing time and/or resources may be needed when performing an FFT to process data from laser radar systems. In some cases, techniques can be used to speed up the Fourier Transform calculation when the output spectrum is sparse; however, such techniques are not applicable to input (i.e., time-domain) data from laser radar systems, which is known to be sparse.

Accordingly, an improved processing method is described herein that leverages the sparse nature of the input data to reduce computational complexity and achieve a faster calculation time of the Fourier Transform.

Figure 7:
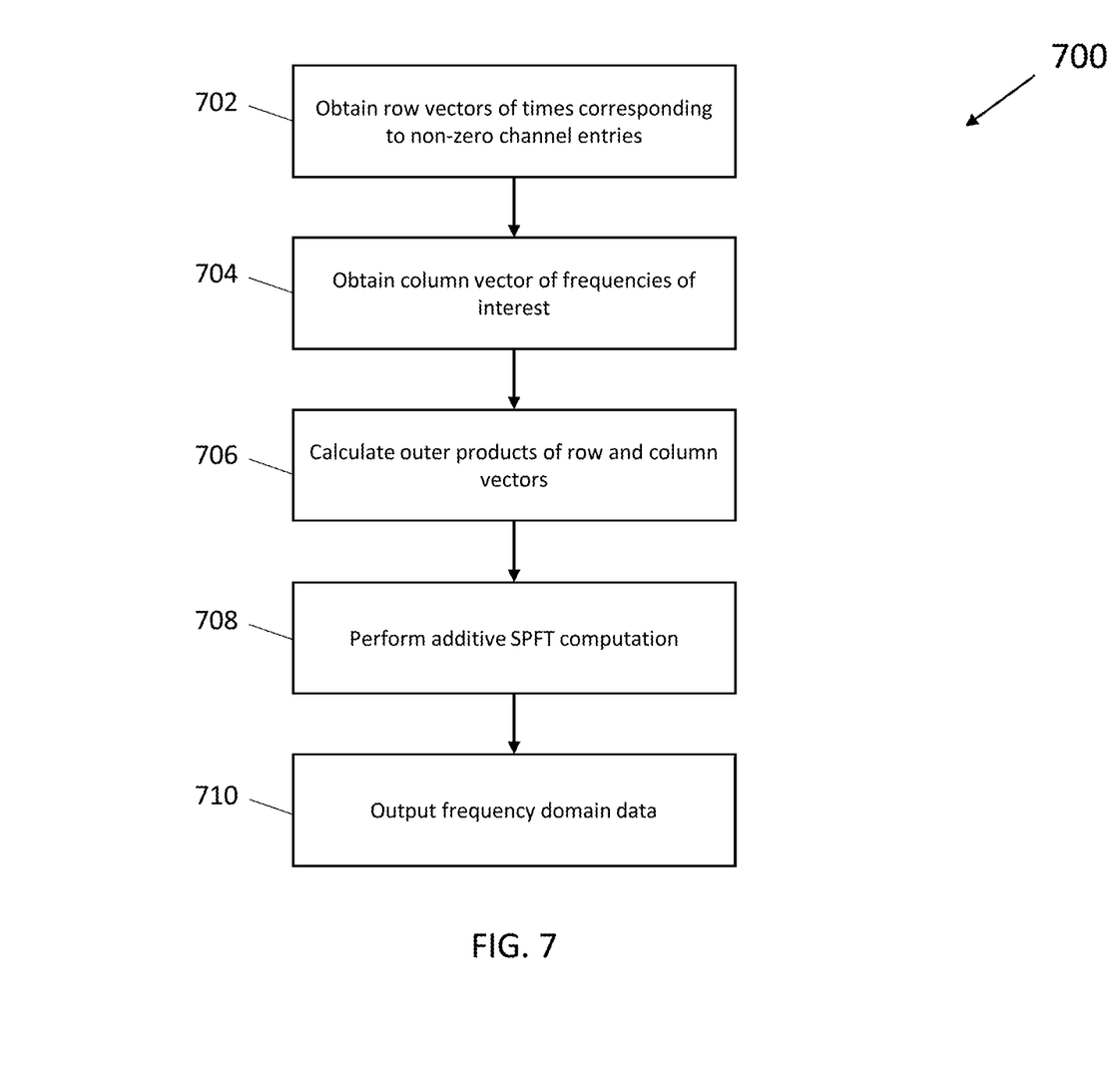
FIG. 7 is a flow diagram of a process for performing a Sparse Partial Fourier Transform (SPFT) in accordance with aspects described herein.

FIG. 7 is a flow diagram of a process 700 for performing a Sparse Partial Fourier Transform (SPFT) in accordance with aspects described herein. In this context, the term "sparse" refers to the input data being binary-valued and mostly zeros and the term "partial" refers to the transform being unidirectional (i.e., the output is not invertible). In one example, the process 700 may be carried out by the controller 310 (i.e., the signal processing module 316); however, in other examples, the process 700 may be carried out by a different controller, processor, or computing system.

At block 702, the controller 310 obtains input row vectors corresponding to times of non-zero channel entries. As described above, the controller 310 is configured to receive the data collected by the laser radar system 302. In one example, the received data corresponds to binary-valued channel entries over a period of time (e.g., a dwell). In some examples, the controller 310 is configured to receive binary-valued channel entries for in-phase (I) and quadrature (Q) modulation channels.

Figure 8:
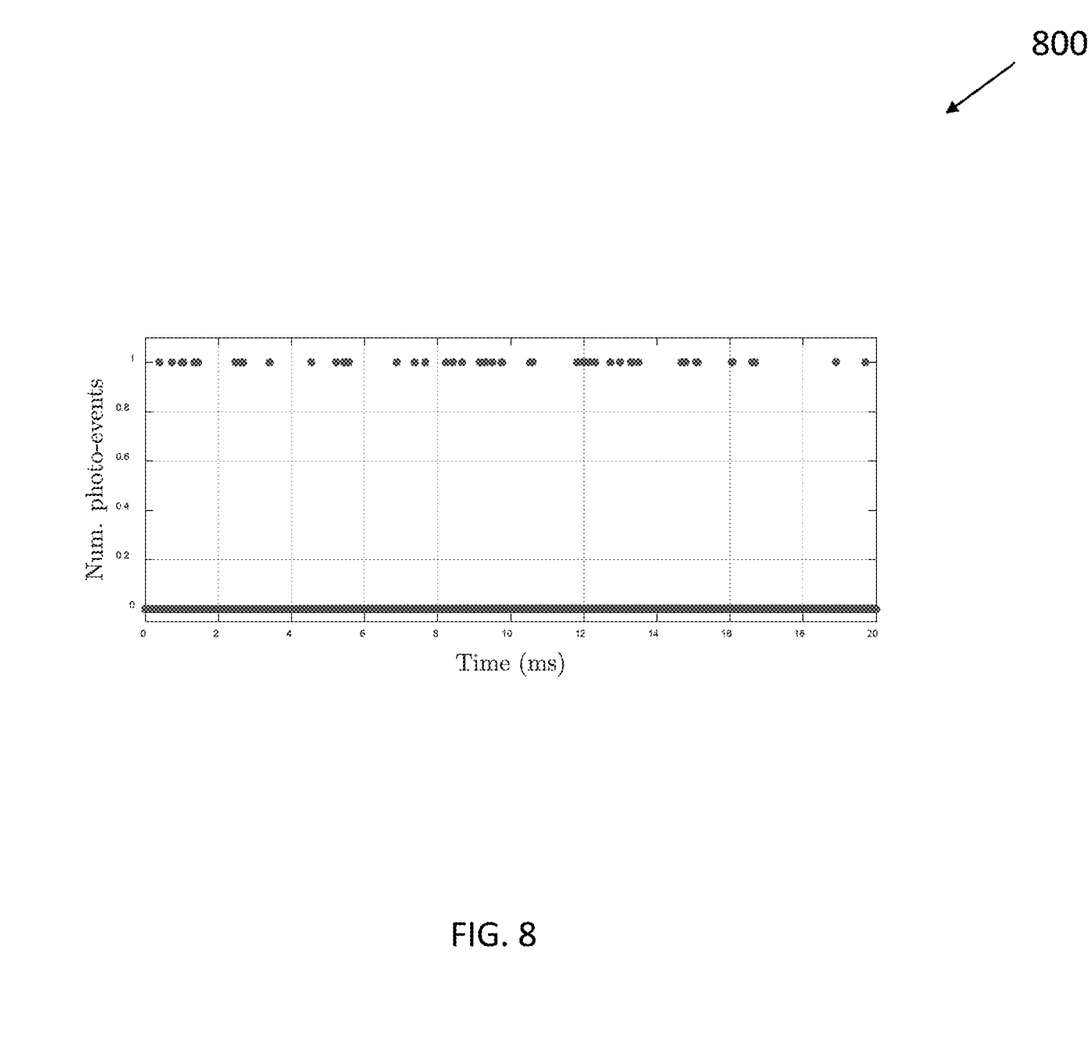
FIG. 8 is a graph of binary-valued channel entries in accordance with aspects described herein.

FIG. 8 is a graph 800 of binary-valued channel entries in accordance with aspects described herein. In one example, the graph 800 represents returns collected over a 20 ms dwell with a temporal sample resolution of 1 ns (i.e., 1 GHz sampling frequency). As shown, channel entries corresponding to times when a photo-event is detected have a value of '1' and channel entries corresponding to times when a photo-event is not detected have a value of '0'. Given the sparse nature of the data, most of the channel entries have a value of '0'.

In one example, the received data can be filtered (or sorted) to produce input row vectors of the times corresponding to non-zero I and Q channel entries. In other words, the I and Q channel entries corresponding to times of no photo-event detections ('0') can be removed. In some examples, the controller 310 is configured to perform the filtering (or sorting) of the received data to remove the zero-valued channel entries; however, in other examples, the data provided to the controller 310 may be pre-filtered (e.g., by the laser radar system 302). In one example, the input row vectors of the times corresponding to non-zero I and Q channel entries each have a length m.

At block 704, the controller 310 obtains an input column vector corresponding to frequencies of interest. In one example, the frequencies of interest correspond to a range of target frequencies (e.g., 1 MHz±25 kHz). The frequencies of interest may be predetermined based on known or expected characteristics of the target or the laser radar system 302. In some examples, the frequencies of interest may be determined based on an expected (or estimated) target velocity and/or waveform parameters of the laser radar system 302. In certain examples, the range of target frequencies can be determined based on prior incoherent processing. For example, the coarse incoherent-based target estimates may be used to determine the range of target frequencies for coherent processing.

In one example, the frequency resolution (and the length of the column vector) corresponds to the sampling frequency and the length of the dwell. For example, the frequency resolution may be defined as shown below in equation (3):

$$F_r = F_s/N \qquad (3)$$

where, $F_s$ is the sampling frequency of the input data (e.g., 1 GHz) and N is the total number of samples collected during the length of the dwell (i.e., zero and non-zero channel entries). In some examples, a length of the input frequency column vector (k) may correspond to a ratio between $F_r$ and the bandwidth of the target frequency range (e.g., 50 kHz). In other examples, a larger frequency resolution (or step size) may be selected to reduce the length k of the input frequency column vector.

At block 706, the controller 310 calculates the outer products of the input row vectors corresponding to times of non-zero channel entries and the input column vector corresponding to frequencies of interest. For example, the outer products of the I and Q data sets can be calculated using equations (4a) and (4b):

$$P_I = v \otimes t_I \qquad (4a)$$

$$P_Q = v \otimes t_Q \qquad (4b)$$

where, v is the input frequency column vector, $t_I$ is the input row vector corresponding to times of non-zero I channel entries, and $t_Q$ is the input row vector corresponding to times of non-zero Q channel entries. As described above, the input row vectors $t_I$ and $t_Q$ have a length m and the input frequency column vector v has a length k. As such, equation (4a) may produce a first matrix $P_I$ and equation (4b) may produce a second matrix $P_Q$, each having dimensions of m×k.

At block 708, the controller 310 performs an additive SPFT computation. In one example, the additive SPFT computation is performed using equation (5):

$$SPFT = \exp(-j2\pi P_I) \cdot I_I + \exp(-j2\pi P_Q) \cdot jI_Q \qquad (5)$$

where, $I_I$ and $I_Q$ are unity column vectors (i.e., column vectors of ones) having lengths equal to $t_I$ and $t_Q$ (i.e., m). The SPFT computation of equation (5) translates the multiplicative computation of the Fourier Transform, shown in equation (2), into a purely additive computation. In other words, the SPFT computation effectively skips the matrix multiplication step and instead selectively sums the elements of the matrix Y that correspond to a time-domain measurement (i.e., a photo-event detection) and a desired frequency-domain output. As such, the computation can be sped up significantly. For example, the SPFT computation has a time complexity of O(mk) that can be several orders of magnitude faster than the O(N log N) time complexity of the FFT computation. In certain examples, due to the sparse nature of the data, this operation can also be performed using look-up tables, rather than explicitly calculating the complex exponential described in equation (5).

At block 710, the controller 310 outputs the frequency spectrum data. In one example, the controller 310 provides output magnitude and phase data over the frequency spectrum (i.e., target frequency range). In one example, the controller 310 is configured to analyze the output magnitude and/or phase data to localize a target frequency. As described above, during a mode corresponding to the coherent function of the laser radar system 302, the controller 310 (i.e., the signal processing module 316 or the target state estimation module 318) may use the target frequency and/or phase information to determine the target state. In some examples, the controller 310 may use the frequency spectrum data to determine a high fidelity target radial velocity of a target being tracked by a laser radar system 302 and/or to tune a laser frequency of the laser radar system 302 to optimally track a target return frequency.

Figure 9:
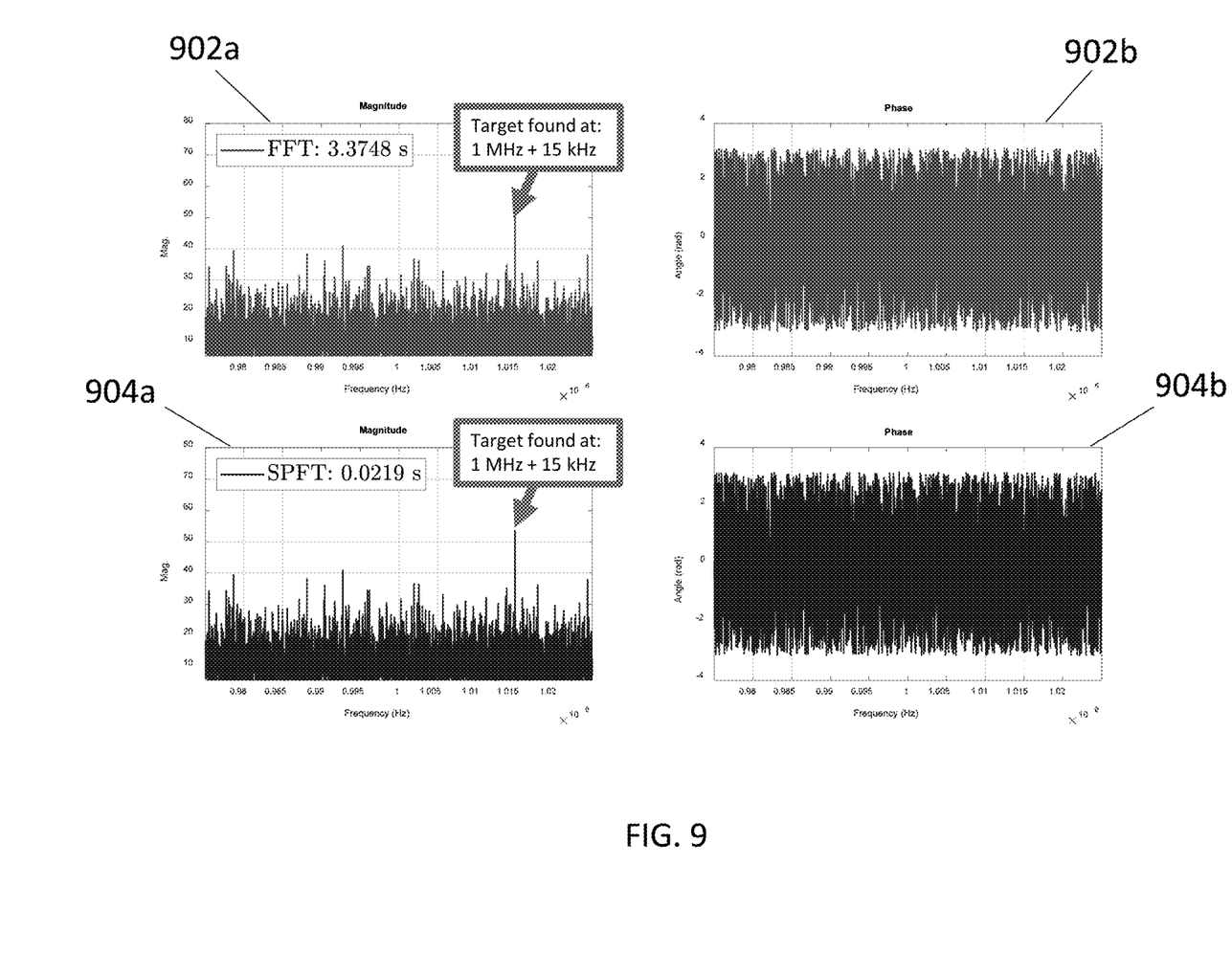
FIG. 9 is graphs of example output magnitude and phase data in accordance with aspects described herein.

FIG. 9 illustrates example output magnitude and phase data in accordance with aspects described herein. In one example, the first magnitude plot 902a and the first phase plot 902b correspond to the FFT technique and the second magnitude plot 904a and the second phase plot 904b correspond to the SPFT technique. As shown, a target frequency can be found in both magnitude plots 902a, 904a at 1 MHz+15 kHz. In one example, the maximum difference between the two spectra is 2.5E-10 in magnitude and 2.1E-10 in phase; however, the runtime of the FFT computation is approximately 3.3748 seconds while the runtime of the SPFT computation is reduced to approximately 0.0219 seconds. As such, the SPFT technique can produce results substantially similar to the FFT technique with a runtime that is over 150 times faster than the FFT technique.

While the SPFT technique and the process 700 for performing the SPFT is described above with respect to laser radar systems (i.e., LIDAR or LADAR) and data corresponding to photo-event detections, it should be appreciated that the SPFT technique and the process 700 may be used with different types of data or applications. For example, it may be advantageous to utilize the SPFT technique and/or the process 700 with any input time-domain data set that is binary-valued, sparse, and bandwidth constrained. In such cases, the SPFT technique may be used to reduce computation complexity and to achieve a faster calculation time of the Fourier Transform.

As described above, an improved control method for operating a multifunction laser radar system is provided herein. In at least one embodiment, the control method utilizes adaptive waveform design, real-time signal processing, and closed-loop feedback to improve the utility of the multifunction laser radar system. In one example, the control method is configured to select a function of the laser radar system to optimize performance and resource utilization. In some examples, the control method is configured to control the laser radar system to utilize incoherent and coherent functions. In addition, an improved processing method is provided herein that leverages the sparse nature of input data to reduce computation complexity and achieve a faster calculation time of the Fourier Transform.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method for transforming data from a time domain to a frequency domain, the method comprising:
   receiving time domain input data, the time domain input data being sparse and binary-valued;

obtaining at least one time vector corresponding to times of non-zero entries in the time domain input data;

obtaining a frequency vector corresponding to frequencies of interest;

determining at least one matrix corresponding to the at least one time vector and the frequency vector;

performing a Sparse Partial Fourier Transform (SPFT) computation using the at least one matrix; and providing frequency domain output data corresponding to the time domain input data;

wherein the at least one time vector has a length m, the frequency vector has a length k, and the SPFT computation has a time complexity of O(mk).

2. The method of claim 1, wherein receiving the time domain input data includes receiving photo-event detections collected by a laser radar system.

3. The method of claim 2, wherein obtaining the at least one time vector includes obtaining a first vector corresponding to an in-phase (I) modulation channel of the laser radar system and a second vector corresponding to a quadrature (Q) modulation channel of the laser radar system.

4. The method of claim 2, further comprising analyzing the frequency domain output data to localize a target frequency corresponding to a target being tracked by the laser radar system.

5. The method of claim 1, further comprising using the frequency domain output data to at least one of:
determine a high fidelity target radial velocity of a target being tracked by a laser radar system, or
tune a laser frequency of the laser radar system to optimally track a target return frequency.

6. The method of claim 5, wherein determining the at least one matrix corresponding to the at least one time vector and the frequency vector includes calculating at least one outer product of the at least one time vector and the frequency vector.

7. The method of claim 1, wherein performing the SPFT computation using the at least one matrix includes selectively summing elements of a reference matrix that correspond to each element of the at least one matrix.

8. The method of claim 7, wherein the reference matrix is a Discrete Fourier Transform matrix.

9. The method of claim 1, wherein the frequency domain output data corresponds to a magnitude and/or a phase over frequency of the time domain input data.

10. A computing system for transforming data from a time domain to a frequency domain, the computing system comprising:
at least one input configured to receive time domain input data, the time domain input data being sparse and binary-valued; and
a controller configured to:
obtain at least one time vector corresponding to times of non-zero entries in the time domain input data;
obtain a frequency vector corresponding to frequencies of interest;
determine at least one matrix corresponding to the at least one time vector and the frequency vector;
perform a Sparse Partial Fourier Transform (SPFT) computation using the at least one matrix; and
provide frequency domain output data corresponding to the time domain input data;
wherein the at least one time vector has a length m, the frequency vector has a length k, and the SPFT computation has a time complexity of O(mk).

11. The computing system of claim 10, wherein the at least one input is configured to receive time domain input data corresponding to photo-event detections collected by a laser radar system.

12. The computing system of claim 11, wherein the at least one time vector includes a first vector corresponding to an in-phase (I) modulation channel of the laser radar system and a second vector corresponding to a quadrature (Q) modulation channel of the laser radar system.

13. The computing system of claim 11, wherein the controller is further configured to analyze the frequency domain output data to localize a target frequency corresponding to a target being tracked by the laser radar system.

14. The computing system of claim 10, wherein the at least one time vector is a row vector and the frequency vector is a column vector.

15. The computing system of claim 14, wherein, to determine the at least one matrix corresponding to the at least one time vector and the frequency vector, the controller is configured to calculate at least one outer product of the at least one time vector and the frequency vector.

16. The computing system of claim 15, wherein, to perform the SPFT computation using the at least one matrix, the controller is configured to selectively sum elements of a reference matrix that correspond to each element of the at least one matrix.

17. The computing system of claim 10, wherein the frequency domain output data corresponds to a magnitude and/or a phase over frequency of the time domain input data.

18. A non-transitory computer readable medium comprising code that, when executed by at least one processor, causes the at least one processor to:
receive time domain input data, the time domain input data being sparse and binary- valued;
obtain at least one time vector corresponding to times of non-zero entries in the time domain input data;
obtain a frequency vector corresponding to frequencies of interest;
determine at least one matrix corresponding to the at least one time vector and the frequency vector;
perform a Sparse Partial Fourier Transform (SPFT) computation using the at least one matrix; and
provide frequency domain output data corresponding to the time domain input data;
wherein the at least one time vector has a length m, the frequency vector has a length k, and the SPFT computation has a time complexity of O(mk).

19. The non-transitory computer readable medium of claim 18, further comprising code that, when executed by the at least one processor, causes the at least one processor to at least one of:
determine a high fidelity target radial velocity of a target being tracked by a laser radar system, or
tune a laser frequency of the laser radar system to optimally track a target return frequency.

20. The non-transitory computer readable medium of claim 18, wherein the code that when executed causes the at least one processor to perform the SPFT computation using the at least one matrix comprises:
code that when executed causes the at least one processor to selectively sum elements of a reference matrix that correspond to each element of the at least one matrix, wherein the reference matrix is a Discrete Fourier Transform matrix.

* * * * *